350-431 SR

XR 3,832,585 1X40134

United States Patent [19]

Eto et al.

[11] 3,832,585

[45] Aug. 27, 1974

[54] IMAGE PICKUP TUBE FOR CONVERTING COHERENT LIGHT IMAGES INTO ELECTRICAL SIGNALS

[75] Inventors: Yoshizumi Eto; Yasunori Kanazawa, both of Hachioji, Japan

[73] Assignee: Hitachi, Ltd., Tokyo, Japan

[22] Filed: July 3, 1972

[21] Appl. No.: 268,701

[30] Foreign Application Priority Data

July 16, 1971 Japan .............................. 46-53285

[52] U.S. Cl. ................ 313/371, 313/477, 350/188

[51] Int. Cl. ..... H01j 5/16, H01j 29/89, H01j 31/26

[58] Field of Search .......... 313/65 R, 65 A, 65 AB, 313/65 T, 66, 67, 110, 111, 112; 350/3.5, 188

[56] References Cited

UNITED STATES PATENTS 2,869,010 1/1959 Gray ................................ 313/65 A Primary Examiner—Herman Karl Saalbach Assistant Examiner—Siegfried H. Grimm Attorney, Agent, or Firm—Craig & Antonelli

[57] ABSTRACT

An image pickup tube for transforming an image obtained by coherent light into a television signal without creating any interference fringes is provided by an optical composite which eliminates an internally generated reflected wave and includes two transparent materials with equal refractive indexes, each having one surface parallel to the image-forming surface of the image pickup tube and another surface not parallel thereto, so arranged that the surface not parallel to the image-forming surface is made optically parallel to each other by interposing therebetween a material different in refractive index from the transparent materials.

6 Claims, 10 Drawing Figures

3832585
OR IN 313/371

IMAGE PICKUP TUBE FOR CONVERTING COHERENT LIGHT IMAGES INTO ELECTRICAL SIGNALS

BACKGROUND OF THE INVENTION

1. Field of the Invention

This invention relates to an image pickup tube, or more in particular to an image pickup tube for transforming an optical image obtained through coherent light into a television signal.

2. Description of the Prior Art

Recently, with the development of the laser apparatus, optical equipment having coherent light source such as the one operating on the principle of holography came into use.

In holography, the object light which is obtained by radiating coherent light on an object is superimposed on a coherent reference light of uniform intensity to effect exposure of film, thus producing a hologram of a stripe pattern generated by the interference of the two types of light. By applying a coherent reference light of uniform intensity, a real image of the object is reproduced.

Great efforts are being made to find a way to watch as a television image reproduced from the hologram. To achieve this purpose, the image reproduced from the hologram is formed on the photo-electric conversion target of an image pickup tube housed in a television camera.

As will be described later, however, the use of an ordinary television image pickup tube results in a number of interference fringes being undesirably produced in addition to the wanted reproduced image, thus presenting very unsightly pictures.

SUMMARY OF THE INVENTION

Accordingly, it is an object of the invention to provide an image pickup tube for converting an optical image obtained by coherent light into an electrical signal.

Another object of the invention is to provide an image pickup tube for converting a hologram image into a television signal without producing any interference fringes.

Still another object of the invention is to provide means for effectively eliminating an undesired reflected light on the image-forming surface of the image pickup tube.

In order to achieve the above-mentioned objects, an optical composite of transparent material is mounted on the light entrance of the image pickup tube, so as to eliminate reflected light of uniform wavefront which causes harmful fringes, from the image-forming section of the image pickup tube.

The above-mentioned optical composite comprises first and second transparent materials of the same refractive index and a third transparent material different from the first and second transparent materials in refractive index. More in detail, each of the first and second transparent materials has two surfaces not parallel with each other, one of them being parallel to the image-forming section of the image pickup tube. One of those two surfaces of the transparent materials which are parallel to the image-forming section constitutes a light-receiving surface, while the other surface is optically attained to the image-forming surface or photo-electric conversion target of the image pickup tube directly or through a material of the same substance as said first and second transparent material. The other surfaces of the transparent materials are arranged in parallel with each other and support therebetween a third transparent material in liquid or gas form. Thus, the third transparent material has two surfaces parallel to each other.

Provision of the optical composite at the light-receiving section of the image pickup tube permits the effective elimination of reflected wave which otherwise might cause harmful fringes. Especially, it has been made possible to obtain an image pickup tube capable of effectively producing a television signal from a hologram.

The above-mentioned and other features and objects of this invention will become more apparent by reference to the following description taken in conjunction with the accompanying drawings.

DESCRIPTION OF THE PREFERRED EMBODIMENTS

To facilitate the understanding of the image pickup tube according to the invention, explanation will be made first of the structure of an embodiment of the invention and the reason why the harmful fringes appear when converting a hologram into a television signal by the use of the image pickup tube.

Figure 1:
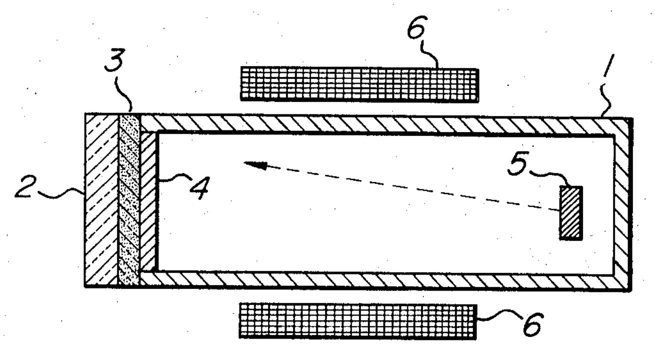
FIG. 1 PRIOR ART
FIG. 1 is a side sectional view showing the structure of a conventional image pickup tube or Vidicon.

A sectional view of a Vidicon is shown in FIG. 1 as an example of the image pickup tube utilizing the photo-electric conduction in the photo-electric conversion target.

In the figure, a transparent face plate 2 of glass or the like with parallel sides is hermetically fitted in the incident light entrance window of the image pickup tube 1 to maintain the inside of the tube as a vacuum. On the back of the face plate 2 are closely attached a transparent electrode 3 and photo-conductive layer 4 whereby incident light produces an image on the photo-conductive layer 4 through the face plate 2 and transparent electrode 3. This image is scanned as the deflection coil 6 acts on an electron beam emitted from the electron gun 5 in the image pickup tube, so that a television signal corresponding to the brightness of the image is produced from the transparent electrode 3.

Thus, by reproducing an image on the photo-conductive layer 4 from the hologram, a television signal corresponding to the reproduced image is obtained, which signal is applied to a television receiver to produce a television image corresponding to the reproduced image.

Figure 2:
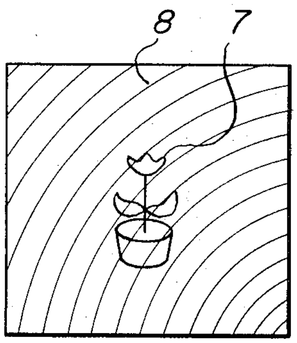
FIG. 2 PRIOR ART
FIG. 2 is a diagram showing a fringe pattern produced when reproducing an image signal from the conventional image pickup tube.
Figure 3:
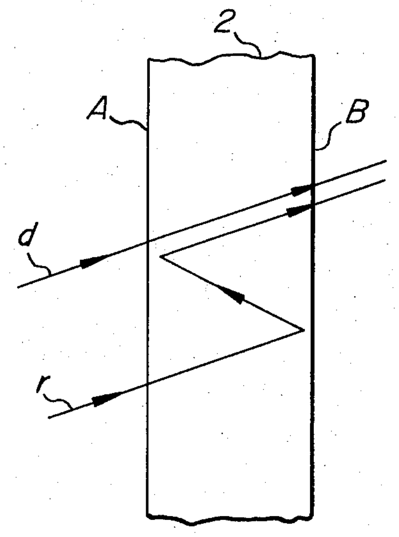
FIG. 3 PRIOR ART
FIG. 3 is a diagram showing an enlarged part of the image pickup tube for explaining the cause of the fringe pattern.

The television image thus obtained, however, is accompanied by a number of intereference fringes 8 in addition to the wanted image 7 as shown in FIG. 2, resulting in a very unsightly picture. The reasons why the interference fringes 8 are produced will be explained below with reference to FIG. 3.

The interference fringes 8 are attributable partly to the fact that incident light is coherent and partly to the fact that both sides of the face plate 2 are parallel to each other. Assume in FIG. 3 that that side of face plate 2 to which incident light is radiated is A and the side thereof provided with the transparent electrode and photo-conductive layer is B. (Neither transparent electrode nor photo-conductive layer is shown in the figure since they are not directly connected with the causes of the interference fringes.) The incident light which enters the image pickup tube by way of the side A of face plate 2 and comes on the transparent electrode and photo-conductive layer through the side B of face plate 2 is a combination of the ray d which enters the tube directly from outside by way of side A and the ray reflected on side B and further on side A after entering the face plate 2 from side A or the ray r which has been repeatedly reflected on sides B and A in the face plate 2. Therefore, if the optical path difference between the direct ray d and the reflected ray r is an even multiple of half of the wavelength of the incident light, the combined light is intensified, while it is weakened when the optical path difference therebetween is an odd multiple thereof.

As a general rule, the rays making up the image reproduced from a hologram are not parallel to each other over the whole area of the face plate 2. By contrast, the fact that the angle of incidence of reflected ray *r* and direct ray *d* varies with each position on the face plate 2 differentiates the optical path difference between them, with the result that they interfere with each other and generate the interference fringes 8 shown in FIG. 2. In this case, if a transparent film is provided on the sides A and B to prevent reflection of light therefrom, the reflected ray r will be weakened and the interference fringes will become lighter. However, it is impossible to achieve the prevention of reflection satisfactorily because the angle of incidence of rays r and d is not constant.

According to the present invention, the interference fringes are prevented from appearing in a television picture and this is achieved by eliminating the reflected ray r before incident light comes on the photo-conductive layer 4 in the face plate 2. The principle on which the present invention operates will be now explained.

Figure 4A:
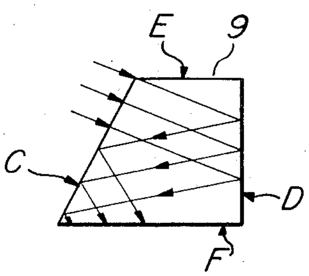
FIGS. 4*a*, 4*b* and 4*c* and FIG. 5 are diagrams shematically showing the essential parts of the image pickup tube according to the present invention to explain the operation thereof.
Figure 4C:
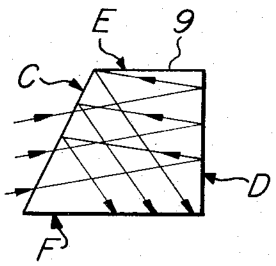
Figure 4B:
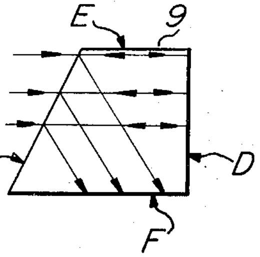

FIG. 4 is a diagram for explaining the principle on which the reflected light is eliminated by the transparent medium. As described above, interference patterns develop as a result of the reflected ray r directly interfering with ray *d* since sides A and B of face plate 2 are parallel to each other. The image pickup tube according to the present invention is provided with the face plate 2 having a transparent prism medium 9 with sides C and D which are not parallel to each other, as shown in FIGS. 4*a*, 4*b* and 4*c*. By doing so, out of the incident rays from side C, those rays which are reflected on side D and further on side C do not return to side D but reach side F.

In this case, the direction of incidence is changed from the state (a) to state (b) by decreasing the incident angle with side D, and further to state (c) by changing the incident angle. In the process, the reflected ray which reaches side F approaches side D. Under this condition, if sides F and E are made diffuse reflection surfaces and the rays reflected on these surfaces are made to have irregular wave fronts, rays reflected on side D will rever return to side D with uniform wave fronts, unless the incident angle increases from state (c). As a result, no interference can occur on side D without producing any interference fringes. Even if sides E and F are not diffuse reflection surfaces and the rays reflected on side F with uniform wave fronts reach side D, the intensity of the rays is attenuated when they are reflected on side F. As a consequence, the interference fringes on side D become lighter and the same effect is achieved as when sides E and F are both diffuse reflection surfaces.

Figure 5:
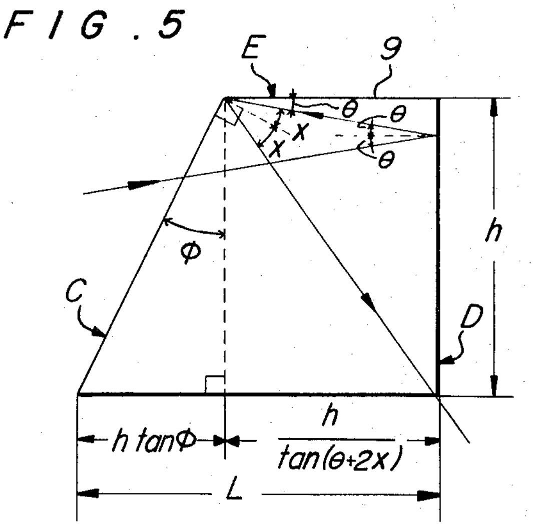

Now explanation will be made of the relationship among the incident angle $\theta$ of light entering side D of the transparent medium 9, the angle $\phi$ between sides C and D, height $h$ of side D and length L of side F under the state of FIG. 4*c*, with reference to FIG. 5. Even though $h$ should preferably be, instead of the height of side D, an effective height of the reproduced image in side D which is determined by the size of the reproduced image or the scanning range of an electron beam, the height of side D will be used as $h$ here for convenience of explanation.

Assuming that the incident angle of the ray reflected on side D and entering side C is $x$, $$\phi = \theta + x \tag{1}$$

$$L = h \tan \phi + h/\tan (\theta + 2x) \tag{2}$$

Therefore, the state as shown in FIG. 4*c* is maintained as long as the following inequality is satisfied:

$$L \geqq h \{\tan \phi + 1/\tan (2\phi - \theta)\} \tag{3}$$

By employing the transparent medium with a shape meeting the above conditions as a face plate, interference fringes are completely eliminated.

An embodiment of the invention operating on the above-mentioned principle will be explained in detail below with reference to FIG. 6 which shows an image pickup tube employing the transparent medium 9 as a face plate. In this figure, symbols C. D, E and F show corresponding sides as shown in FIG. 4. The transparent medium 9 shown in FIG. 5 is mounted on the incident light entrance at right angles to the optical axis of the image pickup tube, and on the outside of this transparent medium 9 is laid another transparent medium 10, in such a manner that sides G and H of transparent medium 9 are arranged in parallel with sides D and C of medium 10 respectively, with a thin transparent medium 11 interposed between sides C and H. The index of refraction of transparent medium 11 is different from that of transparent media 9 and 10, the simplest form of transparent medium 11 being air which is closed in a space between transparent media 9 and 10 with their circumferences bonded with each other.

In the image pickup tube with the abovedescribed structure, part of the rays reflected on side D are reflected on side C and reach side F as long as the inequality 3 is satisfied. Also, part of rays which have passed side C are reflected on side H and reach side F. Further, rays that have passed side H either pass through side G or go outside after being reflected on side G or H. In either case, the rays which are reflected on side D never return to side D with their wave fronts uniform, and therefore they never interfere with light on side D. In addition, since the transparent media 9 and 10 have the same total thickness for any part thereof in the direction of the optical axis, a clear image is formed on the photo-conductive layer 4 on the back of the transparent medium 9. In this construction it was already explained that the occurrence of harmful reflected light is prevented by making sides E and F diffuse reflection surfaces. For the same reason, surfaces I and J should also be preferably diffuse reflection surfaces.

Figure 6:
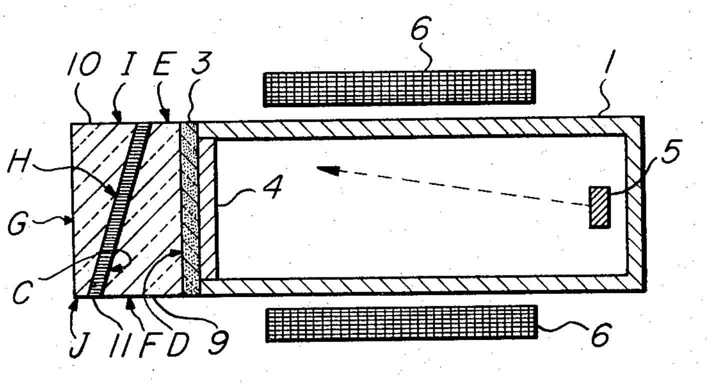
FIGS. 6 and 8 are side sectional views of embodiments of the present invention.
Figure 7:
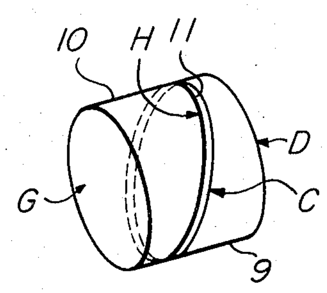
FIG. 7 is a perspective view showing an embodiment of the optical composite which is the essential part of the image pickup tube according to the invention.

The transparent media 9 and 10 in slightly spaced relationship with each other are shown in the perspective view of FIG. 7. This space may be determined at any amount only if it is sufficiently narrow compared with the thicknesses of the transparent media 9 and 10. In other words, the width of the space should be such that the image to be formed on side D of the transparent medium 9 is not formed in the transparent medium 11. In the actual production of the image pickup tube of FIG. 6, it is proper first to mount on the image pickup tube the transparent medium 9 with the transparent electrode 3 and photo-conductive layer 4 on side D, instead of an ordinary glass face plate, and then to bond the transparent medium 10 to the image pickup tube.

In FIG. 6, the structure of the image pickup tube proper is the same as that of the conventional one, and like numerals and symbols in FIGS. 1 and 6 show like parts and functions, which are not explained in this specification as they are not directly related to the present invention.

Figure 8:
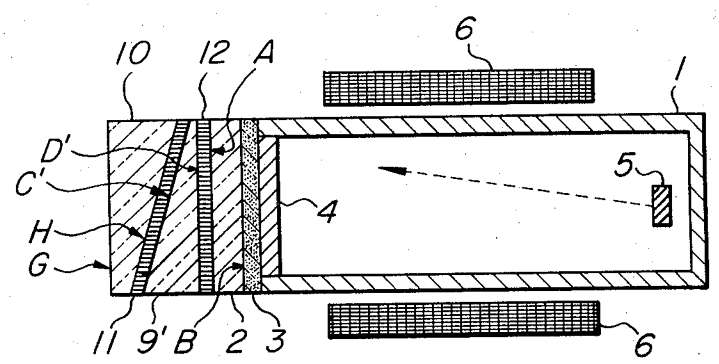

Another embodiment of the invention is shown in FIG. 8. In this case, it is possible to use an ordinary image pickup tube with the face plate 2 as shown in FIG. 1. That is to say, as shown in FIG. 7, the transparent media 9, 10 and 11 are attached onto the outside of face plate 2 through the transparent medium 12. In FIG. 8, the transparent medium 9, surfaces C and D of FIG. 7 are replaced by transparent medium 9′, surfaces C′ and D′, respectively.

Surface D′ of the transparent medium 9′ is maintained parallel to side A of face plate 2, and the refractive index of transparent medium 12 is equal to that of transparent medium 9′ and face plate 2. For example, if the transparent medium 9′ and face plate 2 consist of glass and transparent medium 12 of glycerin, the refractive indexes of these materials are all about 1.5, satisfying the above-mentioned conditions. In this case, the transparent medium 9′ and face plate 2 which are equal in refractive index is considered as an optically integral unit, and therefore no light is reflected on side A or D′. As a result, the transparent media 9′ and 12 and face plate 2 of FIG. 8 perform the same function as the transparent medium 9 of FIG. 6.

Unlike the image pickup tube of FIG. 6 with the transparent medium 9 used as a face plate, the embodiment of FIG. 8 offers great convenience since the transparent media 9′ and 10 can be used with an ordinary image pickup tube. In this case, the total thickness of transparent media 9′ and 12 and face plate 2 is equal to that of transparent medium 9 shown in FIG. 6. This permits the transparent medium 9′ to be thinner than the transparent medium 9.

Although the preceding description was made with reference to a Vidicon shown in FIG. 1, the present invention is applied not only to a Vidicon but other types of image pickup tubes as well, because all types of the image pickup tubes use a face plate with parallel surfaces.

Further, the application of the image pickup tube according to the invention is not limited to the picking up of the image reproduced from a hologram but can be extended to all operations of picking up images consisting of coherent light. It is needless to say that there is no difficulty at all in picking up an ordinary image of coherent light with the image pickup tube according to the present invention.

I claim:

1. In an image pickup tube, an optical composite forming a light receiving section comprising a flat photoelectric conversion target, first and second transparent members having the same refrective index and a third flat transparent member having a different refractive index from said first and second transparent members and being interposed therebetween, said first and second transparent members eavh having the form of a frustum of a cylinder with the truncation surfaces thereof being arranged complementary to each other in contact with respective opposite surfaces of said third transparent member so that said third transparent member is sandwiched between said first and second transparent members and the surfaces of said first and second transparent members opposite to said truncation surfaces thereof are parallel to each other, said photoelectric conversion target being parallel with one of said surfaces which are opposite a truncation surface of one of said first and second transparent members.

2. An image pickup tube as defined in claim 1, wherein said first and second transparent members have the form of a frustum of a circular cylinder.

3. An image pickup tube according to claim 1, wherein said surface of said second transparent member which is parallel to the surface of said photoelectric conversion target is directly in contact with said surface of said photo-electric conversion target.

4. An image pickup tube according to claim 2, wherein said third transparent member comprises a gas.

5. An image pickup tube according to claim 1, wherein the surfaces of said first and second transparent members excepting said surfaces which are in parallel with the surface of said photo-electric conversion target and in contact with said third transparent member are diffuse reflection surfaces.

6. An image pickup tube according to claim 1, wherein that surface of said second transparent member which is parallel to said surface of said photoelectric target is mounted on the surface of a fourth flat transparent member in contact with the surface of said photo-electric conversion target of the image pickup tube.

* * * * *